UNITED STATES PATENT OFFICE.

HERMAN L. HARTENSTEIN, OF CONSTANTINE, MICHIGAN.

PROCESS OF UTILIZING MARL, MAKING CARBID.

No. 844,018. Specification of Letters Patent. Patented Feb. 12, 1907.

Application filed April 17, 1905. Serial No. 255,965.

*To all whom it may concern:*

Be it known that I, HERMAN L. HARTENSTEIN, a citizen of the United States, residing at Constantine, in the county of St. Joseph and State of Michigan, have invented a new and useful Process of Utilizing Marl, of which the following is a specification.

My invention relates to process of utilizing marl.

The object of the invention is to provide a process by which ordinary native marl, such as is found in Michigan and other places, can be utilized for the production of commercial calcium carbid.

A further object of the invention is to provide a cheap, convenient, and highly efficient process by which the above result is obtained and by which a substantially pure grade of carbid is produced.

To these ends my invention consists, substantially, in the method of operation and procedure hereinafter set forth.

According to the ordinary methods such as are commonly practiced in the manufacture of carbid for commercial purposes lime or limestone is mixed with carbonaceous material, such as coke, and the mixture is fused or melted in an electric furnace. In any case it has been necessary to initially crush or pulverize the limestone, and this has been a difficult and expensive part of the process, owing to the nature of limestone, which is a hard and rocky material and difficult to disintegrate.

The material known as "marl" is widely distributed throughout the United States and other places and occurs in the form of a pulverulent, lightly-coherent mud or earth, and is ordinarily found in beds in swampy places and comprising about twenty to fifty per cent. water. In this condition it is grayish or grayish white and becomes much lighter in color when dried.

In spite of the fact that marl is widely distributed and easily obtained its use has hitherto practically been restricted to the manufacture of Portland cement, for which it is largely used. The native marl ordinarily contains from ninety-five to ninety-eight per cent. pure calcium carbonate, and it is on account of this fact that the material is susceptible of use in a process for the manufacture of calcium carbid.

It will be seen that in carrying out my invention many serious objections which have been encountered in manufacturing calcium carbid are overcome and a superior grade of carbid produced by a very cheap, simple, and efficient process. The disintegration of the marl into a fine homogeneous powder is easily effected, so that the inconvenience and expense of the usual method of crushing the limestone rock is by my process entirely done away with. Moreover, after the charge has been introduced into the furnace the uniform fineness and homogeneity of the material is productive of highly superior results. Hitherto the presence of unpulverized masses or particles of lime or limestone within the electric furnace has been a serious difficulty, since such particles not only do not enter into the chemical combination to produce carbid, but they also interfere with the action of the furnace by interposing high resistance to the electric current, so that the action of the furnace is interfered with and sometimes destroyed, and not only is the marl found in a properly-pulverized condition, but it is so widely distributed as to be easily obtained, and the limited number of uses to which it is put renders it a comparatively low-priced commodity upon the market.

In carrying out my invention I first obtain a supply of the usual or native marl, preferably containing a high percentage of calcium carbonate, and expel the moisture therefrom in any suitable manner. If desired, however, the marl may be slightly moist for the purpose of more efficiently calcining the same, as will later appear. After the marl is thus suitably dried it is thoroughly pulverized and reduced to a fine uniform and homogeneous powder, in which condition it may be stored away in bins or receptacles for subsequent use.

Considered in its broadest aspects my invention consists in disintegrating the native marl, either dried or containing a certain percentage of moisture, and mixing the same with a suitable quantity of carbonaceous material and then subjecting the mixture to the action of heat, preferably in the electric furnace. The approximate limits of percentage of moisture when the material is charged in the preheater varies from the native product as it comes from the marl bed or bark to "bone" or very dry. Of course if mixed with carbonaceous material and charged directly into the electric furnace all material should be dry and the marl disintegrated.

In the preferred method of carrying out my invention, however, I burn or calcine the marl previous to its mixture with the carbonaceous material and its treatment in the electric furnace or any suitable rotary calcining-furnace. I also contemplate the use of a mixture of the native marl, together with a quantity of the dried and disintegrated product mixed with carbonaceous material for treatment in the electric furnace, or I may employ a mixture of marl in any form together with a percentage of lime or limestone. It is also obvious that the particular steps taken of the mixture in the electric furnace may be varied widely and still fall within the principles of my invention, since satisfactory results may be obtained with various kinds of electric or other furnaces. For example, the mixture may be fused in an electric or other furnace and allowed to cool in the form of a single core or ingot, or it may be reduced in a furnace and tapped therefrom through suitable openings and drawn off into molds. A superheating compound may be added to the mixture from the calcining-furnace or may be added for maintaining the carbid in a state of fusion during the molding operation, and I have found a suitable compound for this purpose to comprise a mixture of carbid of calcium, black oxid of manganese, chlorate of potash, bituminous coal, and aluminium, all pulverized and mixed together, and which constitutes the subject-matter of my application, Serial No. 280,723, renewal filed September 30, 1905. I do not desire, however, to be limited to the use of a superheating compound or to any particular style or form of furnace, as it is obvious that the purposes of my invention may be obtained in many different ways.

I will now describe the particular steps of a process which I propose to employ for carrying out the principles of my invention. In a practical process embodying the principles of my invention the marl in its native and moist condition is first dried and is then thoroughly crushed or pulverized into powder. While various kinds of marl or mixtures of marl and limestone may be employed, I prefer to make use of a marl which is comparatively rich in carbonate of calcium—for example, a grade of marl which contains between ninety-eight and ninety-nine per cent. pure calcium carbonate. After the marl has been properly dried and disintegrated it is stored away in bins or receptacles for further use. The dried and disintegrated marl is then burned or calcined in any suitable manner, preferably at a high temperature, in any suitable rotary calcining-furnace—say about 3,000° Fahrenheit. I have found by practical experiments that superior results are attained if a certain degree of moisture is allowed to remain in the marl or mixture during the burning or calcining operation. The action of this moisture serves to hold the particles of marl together and prevent their being blown out of the calcining-furnace in the form of dust, and, further, the presence of moisture tends to promote the expulsion of the carbonic acid from the marl. The moisture is converted into steam, and the current of steam and hot air disintegrates and reduces the calcium carbonate much more quickly than a current of dry air alone would be able to do. In practice I have found that under proper conditions the mixture can be calcined by the action of steam and air in one-eighth the time required were the steam not present.

The burned or calcined material consists largely of pure oxid of calcium or lime with a small percentage of silica, magnesia, and alumina. The mass at this stage of the process is in the form of a highly-heated incandescent powder, and in this condition it is ready to be mixed with a suitable quantity of coke or carbonaceous material preparatory to its introduction into the electric furnace and in proper accurately-measured proportions. The mixing operation is preferably performed while the calcined material is still in a heated condition. After mixing, the mass of powdered and still heated materials may be introduced directly into one or more electric furnaces, where they are fused together and made to chemically combine for the production of calcium carbid.

For the purpose of conserving as much heat as is possible throughout the various steps of my process I propose to run the incandescent material from the calcining-furnace directly into the electric furnace after its proper mixture with carbonaceous material, so that the heat of the calcining operation is retained and a less current is required during the final fusing operation. In order to still further conserve the heat of the process, I propose to use the highly-heated waste gases from the calcining-furnace for preheating the powdered coke or carbonaceous material before its mixture with the calcium-containing material. In this way the heat of the waste gases from the calcining-furnace is utilized and the economy and efficiency of my process is increased. After the carbid has been produced in the electric furnace it may be drawn therefrom into molds or allowed to cool within the furnace in the form of a single ingot. After it is cooled it may be broken or crushed into suitable sizes for packing and shipment.

It will be observed that by my process a superior grade of calcium carbid is produced from a common and inexpensive material, which, moreover, occurs in a substantially pulverulent state, so that the expense of disintegration is very much reduced. It is also to be observed that by my process all handling and carrying of the material during the various stages of the process with the attendant inconvenience and waste is now avoided and the process made exceedingly rapid, certain, and convenient, and in addition to this the steps of the process are so taken that the entire amount of heat applied is largely conserved, so that there is very little waste of heat energy, which has always been a very serious item in the expense of manufacturing commercial calcium carbid. It will also be observed that by this process the finely-divided carbon or carbonaceous material which is employed in the manufacture of calcium carbid is brought into most intimate and perfect association with the calcium carbonate, which is the active element in the marl. This is most important in the manufacture of calcium carbid, because, as is well known, the more intimately the carbon is associated with the lime the more uniform will be the product. For reasons which have already been explained it is preferable to calcine the calcium carbonate while in a finely-divided state, and this result could not be more perfectly accomplished than by taking the calcium carbonate in its naturally minutely subdivided condition as found in the form of marl. In this condition its particles are almost infinitesimal, and hence after being calcined or burned to liberate the carbonic-acid gas the resultant lime is in a most perfect and efficient state of mechanical subdivision for being mixed with the carbonaceous material.

The subject-matter of this application is contained in my abandoned application, Serial No. 188,961, filed January 14, 1904.

Having now set forth the object and nature of my invention and the manner of carrying the same into practical operation, what I claim as new and useful and of my own invention, and desire to secure by Letters Patent, is—

1. The process of utilizing marl in the manufacture of carbid, which consists in mixing marl with carbonaceous material, and subjecting the mixture to the fusing or melting action of the electric current, as and for the purpose set forth.

2. The process of utilizing marl in the manufacture of carbid, which consists in calcining marl, mixing the same with carbonaceous material, and fusing the resultant mixture, as and for the purpose set forth.

3. The process of utilizing marl in the manufacture of carbid, which consists in preheating a quantity of marl, introducing the same into a mixture containing coke or carbonaceous material, and subjecting the resulting mixture to the fusing or melting action of the electric current, as and for the purpose set forth.

4. The process of utilizing marl in the manufacture of carbid, which consists in drying and disintegrating marl, mixing the same with carbonaceous material, and subjecting the mixture to the fusing or melting action of the electric current, as and for the purpose set forth.

5. The process of utilizing marl in the manufacture of carbid, which consists in subjecting moistened marl to the calcining or burning action of heat, mixing the same with carbonaceous material, and introducing into an electric furnace, as and for the purpose set forth.

6. The process of utilizing marl in the manufacture of carbid, which consists in forming a mixture of marl containing from ninety-eight to ninety-nine per cent. calcium carbonate with carbonaceous material, and subjecting the mixture to the fusing or melting action of the electric current, as and for the purpose set forth.

7. The process of utilizing marl in the manufacture of carbid, which consists in calcining a mixture of limestone with dried and disintegrated marl, mixing the same with carbonaceous material, and subjecting the mixture to the fusing or melting action of the electric current, as and for the purpose set forth.

8. The process of utilizing marl in the manufacture of carbid, which consists in calcining a mixture of dried and disintegrated marl and native marl, adding carbonaceous material, and subjecting the mixture to the fusing or melting action of the electric current, as and for the purpose set forth.

9. The process of utilizing marl in the manufacture of carbid, which consists in calcining a mixture of limestone, native marl and dried and disintegrated marl, adding carbonaceous material, and subjecting the mixture to the fusing or melting action of the electric current, as and for the purpose set forth.

10. The process of utilizing marl in the manufacture of carbid, which consists in calcining marl, adding carbonaceous material thereto, and introducing the mixture into an electric furnace while in a heated condition, as and for the purpose set forth.

11. The process of utilizing marl in the manufacture of carbid, which consists in calcining marl, and adding to the heated product a quantity of heated carbonaceous material, and at once introducing the mixture into an electric furnace, as and for the purpose set forth.

12. The process of utilizing marl in the manufacture of carbid which consists in calcining marl, passing the same while heated into a mixing-chamber, adding carbonaceous material to said mixing-chamber, and leading the product from the mixing-chamber directly into an electric furnace, as and for the purpose set forth.

13. The process of utilizing marl in the manufacture of carbid, which consists in introducing marl into a rotary calcining-furnace, passing the same into a mixing-chamber, introducing carbonaceous material into said mixing-chamber, leading the product into an electric furnace and subjecting it to the fusing or melting action of the electric current, as and for the purpose set forth.

14. The process of utilizing marl in the manufacture of carbid, which consists in calcining marl, adding carbonaceous material, introducing into an electric furnace, adding a superheating compound, and drawing off the melted product into molds, as and for the purpose set forth.

15. The process of utilizing marl in the manufacture of carbid, which consists in calcining marl having a certain percentage of moisture and limestone, adding carbonaceous material, introducing into a mixing-chamber and passing into an electric furnace, as and for the purpose set forth.

In witness whereof I have hereunto set my hand, this 13th day of April, 1905, in the presence of the subscribing witnesses.

HERMAN L. HARTENSTEIN.

Witnesses:
JAY C. UPTON,
E. LORENCE MARSH